Patented Dec. 10, 1935

2,023,485

UNITED STATES PATENT OFFICE 2,023,485

PREPARATION OF ESTERS DERIVED FROM DICARBOXYLIC ACIDS AND POLYHYDROXY COMPOUNDS

Carl J. Malm and Charles R. Fordyce, Rochester, N. Y., assignors to Eastman Kodak Company, Rochester, N. Y., a corporation of New York No Drawing. Application September 10, 1932, Serial No. 632,560

9 Claims. (Cl. 260—103)

This invention relates to the esters formed by esterifying only one of the carboxyl groups of a dicarboxylic acid with a polybasic compound and in which the other carboxyl group may remain unesterified or may be combined with a monohydroxy alcohol or an incompletely esterified cellulose ester.

It has been previously known to form dicarboxylic acid esters of polybasic alcohols by reacting upon the polybasic alcohol with the anhydride of the dicarboxylic acid; in that previously known reaction, however, both of the carboxyl groups of the acid were esterified by a polyhydroxy alcohol and the final product was a resin.

Although resins are useful for some purposes it is often desirable that the esters of the dicarboxylic acids be non-resinous. An attempt was made to prepare non-resinous esters of dicarboxylic acids by the process disclosed in British Patent No. 316,324. However, to prepare esters of this nature according to the disclosure of that patent, it is necessary that an ether-alcohol be employed to esterify one of the carboxyl groups of the acid.

One object of our invention is to prepare a non-resinous dicarboxylic acid ester of a simple polyhydroxy compound. Another object of our invention is to provide a process for preparing dicarboxylic acid esters of polybasic compounds in which only one of the carboxyl groups of the acid is esterified thus forming an acid ester, which contains a free and available carboxyl which may, if desired, be combined with a monohydroxy alcohol or with a cellulose ester or ether having a free hydroxyl group. Another object of our invention is to prepare compounds which, when combined with organic esters of cellulose, will form products of good and permanent flexibility and plasticity. Another object of our invention is to provide derivatives of cellulose which may be formed into hard transparent products unaffected by the common organic solvents. Another object of our invention is to prepare compositions which may be employed to produce valuable products of various kinds such, for example, as sheeting, molded products, rods, tubes, artificial leather, etc. Other objects of our invention will hereinafter appear.

We have found that non-resinous dicarboxylic acid esters of polyhydroxy compounds may be prepared, only one of the carboxyl groups being esterified therein, by reacting upon the polyhydroxy compound with a dicarboxylic acid anhydride in the presence of a tertiary organic base using at least one molecular equivalent of the base for each molecular equivalent of anhydride present. We have found that these non-resinous acid esters of polyhydroxy compounds may be combined with partially esterified cellulose esters to form compounds which may be employed for products resistant to the action of those agents to which the ordinary derivatives of cellulose are susceptible. We have found that the acid esters of polyhydroxy compounds prepared according to our invention may be caused to react with a monohydroxy alcohol, thereby esterifying the remaining carboxyl group of the ester. We have found that dicarboxylic acid esters so prepared which contain both a monohydroxyl alkyl and a polybasic alcohol substituent may be incorporated with a cellulose ester to form a composition, possessing a good and permanent flexibility, which is suitable for employment in any connection in which plasticized cellulose esters are employed at the present time.

Our non-resinous acid dicarboxylic acid esters of polyhydroxy compounds are prepared by reacting upon the polybasic alcohol with the anhydride of the dicarboxylic acid at an elevated temperature in the presence of at least an equivalent amount of a tertiary base. The reaction is found to take place satisfactorily at approximately 100° C. although it may be varied to suit each individual instance. If pyridine is employed as the tertiary base, the temperature is preferably kept below 115° C. in the absence of refluxing conditions. When quinoline is employed, however, a higher temperature is permissible, although there is not sufficient advantage in the use of a higher temperature to warrant the additional expenditure for more heat.

The following examples illustrate our invention as specifically applied:

*Example I*

About 60 lbs. of ethylene glycol and 300 lbs. of phthalic anhydride were dissolved in approximately 200 lbs. of pyridine and the whole was maintained at a temperature of approximately 100–115° C. for about 2 days. At the end of that time the reaction mixture was poured into 5% hydrochloric acid whereby the product was precipitated. The product was then filtered off, washed with water and was further refined by recrystallizing from ethylene dichloride. Upon examination, the product was found to be an ethylene glycol acid diphthalate having the formula:

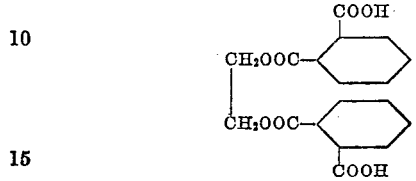

*Example II*

The same procedure was employed as in Example I except that about 130 lbs. of hydroquinone was used instead of the 60 lbs. of ethylene glycol in that example. A hydroquinone acid diphthalate was formed, having the formula:

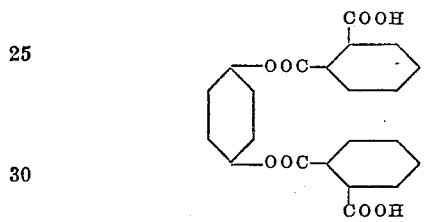

*Example III*

The same procedure was followed as was employed in Example I except that about 200 lbs. of succinic anhydride was used instead of the 300 lbs. of phthalic anhydride in that example. The product resulting was an ethylene glycol acid disuccinate having the following formula:

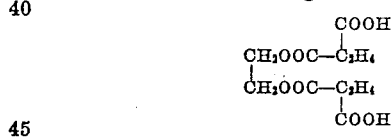

*Example IV*

The procedure of Example I was again followed except that approximately 300 lbs. of quinoline was substituted for the pyridine employed in that example. The temperature was allowed to range from approximately 100 to 150° C. The final product was an ethylene glycol acid diphthalate.

*Example V*

About 92 lbs. of glycerol and 450 lbs. of phthalic anhydride were dissolved in approximately 500 lbs. of pyridine and the solution was maintained at a temperature of about 90° C. (by heating with steam) for about 48 hours. The mass was then treated with an excess of dilute hydrochloric acid upon which a heavy oil separated out as a separate layer. This heavy oil was removed and washed several times with water to free it of any acid remaining. The resulting product, glycerol acid triphthalate, is suitable as thus obtained for most uses some of which are disclosed herein. However, if a dry product is desired, the product may be dissolved in ether and dried over potassium hydroxide in the manner well known in the art for removing moisture from liquids compatible with this process.

In the above examples the precipitation may take place in a dilute aqueous solution of any of the ordinary mineral acids. The concentration also may vary. In place of the 5% hydrochloric acid, concentrations of various mineral acids such as sulfuric, phosphoric, etc., up to 50% will be suitable. The tertiary base neutralizes the free carboxyl group during the reaction and by the acid precipitation this carboxyl group is freed and pyridine hydrochloride is formed in the precipitating bath. This tertiary base may be recovered from the precipitating liquid by the addition of an alkali whereupon much of the pyridine may be salted out from the solution and the remaining portion may be recovered by extraction or distillation.

Obviously various modifications of a technical nature may be made in the preparation of the acid dicarboxylic acid esters of polyhydroxy compounds. As stated above, tertiary bases may be employed in the bath and some of the compounds from this class which would at once suggest themselves to those skilled in the art as suitable as a catalyst in addition to pyridine and quinoline mentioned above, are: alpha-picoline, dialkylanilines, hexahydro-dialkyl anilines, dimethyl n-hexylamine, isoamyl diethylamine, etc. Although phthalic and succinic anhydrides have been found to be quite satisfactory, it is to be understood that the anhydrides of other dicarboxylic acids whether aliphatic or aromatic, substituted or unsubstituted, saturated or unsaturated may be found suitable for the preparation of acid esters of polyhydroxy compounds. The anhydrides of acids such as diglycollic, glutaric, etc., at once suggest themselves to those skilled in the art as suitable for employment in the preparation of acid esters of polyhydroxy compounds according to the present invention.

Either a polyhydroxy phenol or a polyhydroxy alcohol, preferably unsubstituted, may be employed as the polyhydroxy compound in the process of our invention.

The acid dicarboxylic acid ester of a polybasic alcohol may be completely esterified by reacting upon it with a monohydroxy alcohol by treating in an excess of the alcohol in anhydrous form preferably in the presence of a catalyst. As an example, about 10 lbs. of the ethylene glycol acid diphthalate prepared according to Example I was dissolved in 60–80 lbs. of anhydrous ethyl alcohol into which solution was introduced about 1% of dry HCl gas. The mixture was allowed to stand at about 20° C. for approximately 24 hours, at the end of which time the HCl and alcohol were distilled off. The ethylene glycol diethyl diphthalate formed was refined by dissolving it in ether, washing the ether solution with aqueous sodium carbonate and drying it over calcium chloride. The ether was then distilled off and the product remained.

Although due to their commonness, the use of methyl or ethyl alcohol is preferred in completely esterifying the acid dicarboxylic esters, other monohydroxy alcohols may be employed if the compound prepared by the use of that other alcohol has a desired property which is not exhibited by the compound in which methyl or ethyl groups are present. Any of the acid dicarboxylic acid esters of the polyhydroxy compounds prepared as set out herein or for that matter in any manner will be found to be susceptible to additional esterification by the monohydroxy alcohols in accordance with the process of our invention.

These dicarboxylic acid esters in which the hydrogen of one carboxyl group is replaced by a polyhydroxy compound group and the hydrogen of the other carboxyl by a monohydroxy alcohol group are eminently suited for plasticizing cellulose derivatives with which they are compatible. For example, an acetone-soluble cellulose acetate containing 10% of ethylene glycol dimethyl diphthalate when coated out from its solution in the form of a sheet exhibited a flexibility of 6 folds when tested on a Schopper fold tester. This sheet was subjected to a heat of 65° for more than 135 days before it became brittle in contrast to only a 30-day period to produce brittleness in a sheet of non-plasticized cellulose acetate. These plasticizers are also useful in the case of cellulose nitrate and cellulose ethers. Ethylene glycol dimethyl diphthalate unlike some of the commonly employed plasticizers, at present, is compatible in all proportions in these derivatives of cellulose.

Some of the esters which we have prepared and have found suitable as plasticizers for cellulose derivatives particularly the organic esters of cellulose are: Glycerol trimethyl triphthalate, ethylene glycol dimethyl diphthalate, hydroquinone diethyl diphthalate, glycerol trimethyl trisuccinate, ethylene glycol diethyl disuccinate, and hydroquinone dimethyl disuccinate.

Instead of preparing these compounds as disclosed above they may also be prepared by reacting upon an acid mono-basic alcohol ester of a dicarboxylic acid with a polyhydroxy compound. For instance, if an ethyl acid phthalate, the preparation of which is disclosed in U. S. Patent No. 1,704,306 of Stinchfield, is employed as the starting material and this ester is reacted upon by means of an excess of a polyhydroxy compound such as ethylene glycol in the presence of a suitable catalyst, an ethylene glycol diethyl diphthalate would be formed.

We have found that the acid monobasic alcohol esters of the aliphatic dicarboxylic acids may be chemically united with a cellulosic material such as cellulose or a cellulose ester containing free and esterifiable hydroxy groups. For example, if 2 parts of cellulose or cellulose acetate containing 38% acetyl is treated with a mixture of 15 parts of ethyl hydrogen adipate, 20 parts of chloracetic anhydride, 20 parts of monochloracetic acid and .5 parts of magnesium perchlorate trihydrate at 60-65° a homogeneous dope containing cellulose ethyl adipate (or cellulose acetate ethyl adipate if the starting material was cellulose acetate) will be formed. The ester may be precipitated from the dope with methyl alcohol.

As a second example, a mixture of 5 parts of cellulose acetate of 38% acetyl, 10 parts of ethyl hydrogen adipate, 10 parts of methoxy acetic anhydride, 10 parts of ethylene dichloride and .1 part of magnesium perchlorate may be heated for five hours at 50° C. The reaction mixture is then precipitated in methyl alcohol, washed and dried. The product is soluble in ethylene chloride, acetone, ethyl acetate and in hot benzene and toluene.

If desired the mixed esters may also be prepared by treating cellulose as in the examples providing the esterifying bath contains an acid or anhydride which will supply an acyl group which replaces part of the hydroxyl in the cellulose. The corresponding esters of other aliphatic dicarboxylic acids than adipic, such as succinic, maleic, etc., also may be employed in this connection.

We have found that these esters especially the cellulose acetate alkyl dicarboxylates are eminently suited for the preparation of molded products. In the molding of cellulose esters it is necessary that the composition employed softens and molds at a temperature safely below its decomposition point, due to the fact that in the case of cellulose nitrate there is the explosion hazard while with the organic esters of cellulose some of these such as cellulose acetate may exhibit a tendency to darken and decompose at its melting point. These cellulose acetate alkyl dicarboxylates however soften and can be molded at a temperature and pressure well below their decomposition points and within the range common to present practice in the molding industry. For example when a cellulose acetate methyl succinate containing about 30% methyl succinyl is subjected to a temperature of 130° C. and a pressure of 2500 lbs. per square inch in a suitable mold, a clear hard transparent product is obtained. If a cellulose acetate benzyl succinate is similarly subjected to a temperature of approximately 170° C. with a pressure of 2500 lbs. per square inch in a suitable mold a clear hard transparent product will be obtained.

We have found that the acid dicarboxylic acid esters of polyhydroxy compounds prepared according to our process disclosed herein, may be combined with cellulose derivatives, especially organic esters of cellulose, which contain free and esterifiable hydroxyl groups. This reaction may be caused to take place either under the influence of an impelling agent, such as a chlor fatty acid anhydride as disclosed in Clarke and Malm U. S. Patent No. 1,880,808 or an alkoxy fatty acid anhydride such as ethoxy acetic as disclosed in Clarke and Malm application Serial No. 520,150, or under the influence of an elevated temperature preferably between 100° and 125° C. Other agencies such as ultra-violet light might also be found to influence this chemical combination and in such a case might be employed instead of the heat or the chemical impelling agent. The term "impelling agent" as employed herein is to be understood as referring to an agent, whether chemical or physical which will cause the reaction between the cellulose derivative and the acid dicarboxylic acid ester to occur.

It appears that when an acid dicarboxylic acid ester of a polyhydroxy compound is combined with a cellulose derivative such as cellulose acetate containing free and esterifiable hydroxyl groups the reaction may be represented structurally as follows:

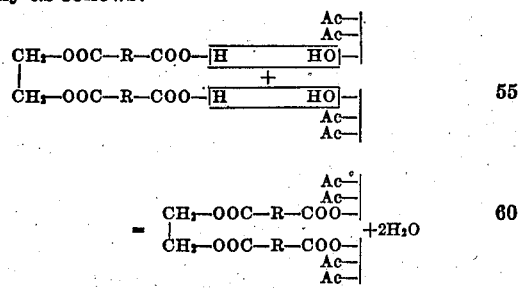

in which an ethylene glycol acid ester is used for the purpose of illustration and in which R represents the portion of the dicarboxylic acid exclusive of the two carboxyl groups. For instance, if the acid is phthalic, R represents the benzene ring with the hydrogens of positions 1 and 2 missing. For convenience the C₆ portion of cellulose acetate is represented by

If a trihydroxy compound such as glycerol were employed obviously three C₆ portions of cellulose acetate as represented would be necessary per molecule of alcohol to react upon all three of the hydroxyl groups presented thereby.

The following examples illustrate the preparation of these cellulose derivatives:

5 parts of cellulose acetate containing 38% acetyl was treated with a mixture of approximately 15 parts of ethylene glycol hydrogen diphthalate, 20 parts of chloracetic anhydride, 20 parts of ethylene chloride and .5 parts of magnesium perchlorate. The whole was maintained at a temperature of 60° C. for approximately 20 hours at the end of which time a solid transparent jell was obtained. If desired, the esterification mixture may be spread out before the reaction takes place so that a jell in sheet form is produced. When this jell dries down the excess chemicals can be extracted resulting in an insoluble, transparent skin.

About 100 parts of cellulose acetate containing 38% acetyl together with approximately 50 parts of ethylene glycol acid diphthalate was dissolved in about 600 parts of acetone. This solution was spread out and the acetone was allowed to evaporate first at room temperature and then at 65° C. The skin formed was stripped off from the surface on which it formed and after curing it at 65° C., it was exposed to a temperature of 110° C. for about 24 hours whereupon a skin insoluble in all organic solvents is formed. As is well known, a product resistant both to moisture and the action of organic solvents has great practical utility in present day commercial activity. For instance containers, washers, valves, protective coverings and numerous other articles which will be exposed to organic solvents or their vapors may be prepared from these solvent-resistant cellulose derivatives.

If it is desired to produce molded articles instead of sheets, the cellulose ester and the acid dicarboxylic acid ester together with a plasticizer may be mixed thoroughly and the mixture may then be molded under high pressure and temperature, the reaction taking place during the molding operation. These solvent-resistant products may be employed in most of the applications in which solvent-resistant plastic materials are employed. These cellulose esters, however, are especially valuable in the finer arts in which plastic materials are employed, such as, for example, in making phonograph records where accuracy in the reproduction of sound is important.

The dicarboxylic acid esters which may be combined with cellulose derivatives as described may be esters of aliphatic and/or aromatic, saturated, unsaturated or substituted dicarboxylic acids with mono-, di- or trihydroxy compounds. The cellulose derivatives which may be employed may be any derivative which contains free and esterifiable hydroxyl groups such as cellulose-ethers or cellulose esters particularly the organic esters of cellulose. For instance, a cellulose acetate-propionate containing free and esterifiable hydroxyl groups could be employed in the above examples instead of a cellulose acetate.

Various modifications of our processes apparent to those skilled in the art are understood to come within the scope of our invention.

The term "polyhydroxy compound" as employed herein is to be understood as referring to compounds such as the di- or trihydroxy alcohols and the polyhydroxy phenols. This term does not include the group of compounds known as the saccharides which group includes sugars, starch, dextrin, cellulose, octabiose and their immediate derivatives.

We claim as our invention:

1. The process of preparing an acid dicarboxylic acid ester of a non-saccharide polyhydroxy compound which comprises reacting upon the polyhydroxy compound with a dicarboxylic anhydride and at least an equivalent amount of a tertiary base and then precipitating out the resulting product with a dilute mineral acid.

2. The process of preparing an acid dicarboxylic acid ester of a non-saccharide polyhydroxy compound which comprises reacting upon the polyhydroxy compound with a dicarboxylic anhydride and at least an equivalent amount of a tertiary base selected from the group consisting of pyridine and quinoline and then precipitating out the resulting product with a dilute mineral acid.

3. The process of preparing an acid dicarboxylic acid ester of a non-saccharide polyhydroxy alcohol which comprises reacting upon the polyhydroxy alcohol with a dicarboxylic anhydride and at least an equivalent amount of a tertiary base and then precipitating out the resulting product with a dilute mineral acid.

4. The process of preparing an acid dicarboxylic acid ester of a non-saccharide polyhydroxy phenol which comprises reacting upon the polyhydroxy phenol with a dicarboxylic anhydride and at least an equivalent amount of a tertiary base and then precipitating out the resulting product with a dilute mineral acid.

5. The process of preparing an acid dicarboxylic acid ester of ethylene glycol which comprises reacting upon the ethylene glycol with a dicarboxylic anhydride and at least an equivalent amount of a tertiary base and then precipitating out the resulting product with a dilute mineral acid.

6. The process of preparing an acid phthalate of a polyhydroxy compound which comprises reacting upon the polyhydroxy compound with phthalic anhydride and at least an equivalent amount of a tertiary base and then precipitating out the resulting product with a dilute mineral acid.

7. The process of preparing an acid phthalate of ethylene glycol which comprises reacting upon the ethylene glycol with phthalic anhydride and at least an equivalent amount of a tertiary base and then precipitating out the resulting product with a dilute mineral acid.

8. The process of preparing an acid phthalate of ethylene glycol which comprises reacting upon the ethylene glycol with phthalic anhydride and at least an equivalent amount of pyridine and then precipitating out the resulting product with a dilute mineral acid.

9. In the process of preparing an acid dicarboxylic acid ester of a non-saccharide polyhydroxy compound, the step which comprises reacting upon the polyhydroxy compound with a dicarboxylic acid anhydride and at least an equivalent amount of a tertiary base.

CARL J. MALM.
CHARLES R. FORDYCE.